United States Patent [19]

Gordon

[11] 4,308,316
[45] Dec. 29, 1981

[54] NON-IRIDESCENT GLASS STRUCTURES

[76] Inventor: Roy G. Gordon, 22 Highland St., Cambridge, Mass. 02138

[21] Appl. No.: 83,809

[22] Filed: Oct. 11, 1979

Related U.S. Application Data

[62] Division of Ser. No. 784,542, Apr. 4, 1977, Pat. No. 4,187,336.

[51] Int. Cl.³ .......................... G02B 5/22; B05B 5/00
[52] U.S. Cl. ................................. 428/336; 428/432; 428/469; 428/34; 350/1.6; 350/166; 427/160; 427/165; 427/166; 427/167; 427/419.2; 427/419.3; 428/428; 428/448; 428/697; 428/698; 428/701
[58] Field of Search ............... 427/160, 165, 166, 167, 427/404, 419.2, 419.3; 350/164, 166, 1.6, 1.7; 428/432, 34, 469, 333, 539, 336; 52/171

[56] References Cited

U.S. PATENT DOCUMENTS

| | | | |
|---|---|---|---|
| 2,617,741 | 11/1952 | Lytle | 427/314 |
| 3,706,485 | 12/1972 | Fawcett | 350/164 |
| 3,710,074 | 1/1973 | Stewart | 52/171 |
| 3,885,855 | 5/1975 | Gross | 350/166 |
| 3,889,026 | 6/1975 | Groth | 350/1.6 |
| 3,962,062 | 6/1976 | Ingrey | 350/164 |

FOREIGN PATENT DOCUMENTS

1595810  4/1971  Fed. Rep. of Germany.

*Primary Examiner*—Michael R. Lusignan
*Assistant Examiner*—Richard Bueker
*Attorney, Agent, or Firm*—Robert A. Cesari; John F. McKenna; Andrew F. Kehoe

[57] ABSTRACT

This disclosure describes transparent glass window structures of the type bearing a first coating of infra-red reflective material which is advantageously less than about 0.85 microns in thickness and wherein the observance of iridescence resulting from such a first coating is markedly reduced by provision of a second coating arranged in register with said first coating, the second coating providing at least two interfaces which, with the mass of the second coating, form means to reflect and refract light therefrom to interfere with the observation of iridescence. The invention also encompasses processes for providing such windows. A particular advantage of the invention is its efficacy with clear and lightly tinted glasses wherein the problem of iridescent color has had its greatest commercial impact.

103 Claims, 4 Drawing Figures

NON-IRIDESCENT GLASS STRUCTURES

This is a division of application Ser. No. 784,542 filed Apr. 4, 1977, now U.S. Pat. No. 4,187,336, patented Feb. 5, 1980.

BACKGROUND OF THE INVENTION

This invention relates to glass structures bearing a thin, functional, inorganic coating (e.g. a coating of tin oxide forming means to promote reflectivity of infra-red light) which structures have improved appearance as a consequence of reduced iridescence historically associated with said thin coatings, and methods for achieving the aforesaid structures.

Glass and other transparent materials can be coated with transparent semiconductor films such as tin oxide, indium oxide or cadmium stannate, in order to reflect infra-red radiation. Such materials are useful in providing windows with enhanced insulating value (lower heat transport) in ovens, architectural windows, etc. Coatings of these same materials also conduct electricity, and are employed as resistance heaters to heat windows in vehicles in order to remove fog or ice.

One objectionable feature of these coated windows is that they show interference colors (iridescence) in reflected light, and, to a lesser extent, in transmitted light. This iridescence has been a serious barrier to widespread use of these coated windows (see, for example, American Insitute of Physics Conference Proceeding No 25, New York, 1975, Page 288.)

In some circumstances, i.e. when the glass is quite dark in tone (say, having a light transmittance of less than about 25%) this iridescence is muted and can be tolerated. However, in most architectural wall and window applications, the iridescent effect normally associated with coatings of less than about 0.75 microns is aesthetically unacceptable to many people (See, for example, U.S. Pat. No. 3,710,074 to Stewart). Little or no success has been achieved in substantially reducing or eliminating the objectionable and apparent iridescence in clear, blue-green and lightly tinted glasses.

Iridescent colors are quite a general phenomenon in transparent films in the thickness range of about 0.1 to 1 micron, especially at thicknesses below about 0.85 microns. Unfortunately, it is precisely this range of thickness which is of practical importance in most commercial applications. Semiconductor coatings thinner than about 0.1 micron do not show interference colors, but such thin coatings have a markedly inferior reflectance of infra-red light, and a markedly reduced capacity to conduct electricity.

Coatings thicker than about 1 micron also do not show visible iridescence, in daylight illumination, but such thick coatings are much more expensive to make, since larger amounts of coatings materials are required, and the time necessary to deposit the coating is correspondingly longer. Furthermore, films thicker than 1 micron have a tendency to show haze, which arises from light scattering from surface irregularities, which are larger on a such film. Also, such films show a greater tendency to crack, under thermal stress, because of differential thermal expansion.

As a result of these technical and economic constraints, almost all present commercial production of such coated glass articles comprise films in the thickness range of about 0.1 to 0.3 microns, which display pronounced iridescent colors. Almost no architectural use of this coated glass is made at present, despite the fact that it would be cost-effective in conserving energy to do so. For example, heat loss by infra-red radiation through the glass areas of a heated building can approximate about one-half of the heat loss through uncoated windows. The presence of iridescent colors on these coated glass products is a major reason for the failure to employ these coatings.

SUMMARY OF THE INVENTION

It is one object of the present invention to provide means to eliminate the visible iridescence from semiconducting thin film coatings on glass, while maintaining their desirable properties of visible transparency, infra-red reflectivity, and electrical conductivity.

Another object of the present invention is to achieve the above goals without increasing the cost of production significantly over the cost of using ordinary iridescent films.

Another object of the present invention is to achieve the above aims with a process which is continuous and fully compatible with modern manufacturing processes in the glass industry.

A further object of the present invention is to achieve all of the above goals with products which are highly durable and stable to light, chemicals and mechanical abrasion.

Another object is to achieve all of the above goals using materials which are sufficiently abundant and readily available to permit widespread use.

Still another object of the invention is to provide a novel double-glazed structure bearing an ultra-thin, infra-red-reflective substance, which structure is free of objectionable iridescence.

Another object of the invention is to provide a glass structure comprising a compound coating wherein an outer coating is formed of an infra-red reflecting surface of about 0.7 microns or less and wherein an inner coating forms means for (a) reducing haze on the coated glass and, simultaneously and independently (b) reducing the iridescence of the glass structure by means of coherent addition of reflected light.

A further object of the invention is to provide a glass structure having the non-iridescent characteristics referred to above which structure is characterized by a step-wise, or a graduated, change in coating composition between glass and air.

Other objects of the invention will be obvious to those skilled in the art on reading the instant invention.

One aspect of the invention utilizes the formation of one or more layers of transparent material between the glass and the semiconductor film. These layers have refractive indices intermediate between those of the glass and the semi-conductor film. With suitable choices of thickness and refractive index values, it has been discovered, the iridescent colors can be made too faint for most human observers to detect, and certainly too faint to interfere with widespread commercial use even in architectural applications. Suitable materials for these intermediate layers are also disclosed herein, as well as processes for the formation of these layers.

Another novel method embodiment disclosed and claimed herein is the assembling of two glass surfaces with coatings offset from one another by 0.25 of a visible wavelength in thickness (e.g. about 0.07 microns when tin oxide coatings are used) in register with one another such that light which would form the iridescent colors is incoherently added, effectively reducing any undesirable iridescent effect below the threshold of aesthetic objection. For the purposes of this embodiment, it should be noted that the 0.25 wavelength designation is the optical equivalent of 0.75, 1.25, etc., wavelengths; albeit the thicker coatings are economical only in special situations. Examples of this embodiment include a double glazed windows with one coating on each sheet or a single sheet of glass with a coating on each glass surface.

A unifying aspect of these various embodiments is that they all utilize a thin semiconductor coating arranged congruently with a second coating which forms means to substantially diminish iridescence by providing at least two additional interfaces forming means, with the mass of the second coating, to reflect and refract light in such a way that it markedly interferes with the observation of any iridescent colors.

METHODS AND ASSUMPTIONS

It is believed desirable, because of the subjective nature of color perception, to provide a discussion of the methods and assumptions which have been used to evaluate the inventions disclosed herein. It should be realized that the application of much of the theory discussed below is retrospective in nature because the information necessarily is being provided in hindsight, i.e. by one having a knowledge of the invention disclosed herein.

In order to make a suitable quantitative evaluation of various possible constructions which suppress iridescent colors, the intensities of such colors were calculated using optical data and color perception data. In this discussion, film layers are assumed to be planar, with uniform thickness and uniform refractive index within each layer. The refractive index changes are taken to be abrupt at the planar interfaces between adjacent film layers. Real refractive indices are used, corresponding to negligible absorption losses within the layers. The reflection coefficients are evaluated for normally incident plane waves of unpolarized light.

Using the above assumptions, the amplitudes for reflection and transmission from each interface are calculated from Fresnel's formulae. Then these amplitudes are summed, taking into account the phase differences produced by propagation through the relevant layers. These results have been found to be equivalent to the Airy formulae (see, for example, *Optics of Thin Films*, by F. Knittl, Wiley and Sons, New York, 1976) for multiple reflection and interference in thin films, when those formulae applied to the same cases I considered.

The calculated intensity of reflected light has been observed to vary wavelength, and thus is enhanced in certain colors more than in others. To calculate the reflected color seen by an observer, it is desirable first to specify the spectral distribution of the incident light. For this purpose, one may use the International Commission on Illumination Standard Illuminant C, which approximates normal daylight illumination. The spectral distribution of the reflected light is the product of the calculated reflection coefficient and the spectrum of Illuminant C. The color hue and color saturation as seen in reflection by a human observer, are then calculated from this reflected spectrum, using the uniform color scales such as those known to the art. One useful scale is that disclosed by Hunter in Food Technology, Vol. 21, pages 100–105, 1967. This scale has been used in deriving the relationship now to be disclosed.

The results of calculations, for each combination of refractive indices and thicknesses of the layers, are a pair of numbers, i.e. "a" and "b". "a" represents red (if positive) or green (if negative) color hue, while "b" describes a yellow (if positive) or blue (if negative) hue. These color-hue results are useful in checking the calculations against the observable colors of samples including those of the invention. A single number, "c", represents the "color saturation": $c=(a^2+b^2)^{\frac{1}{2}}$. This color saturation index, "c", is directly related to the ability of the eye to detect the troublesome iridescent color hues. When the saturation index is below a certain value, one is not able to see any color in the reflected light. The numerical value of this threshold saturation for observability depends on the particular uniform color scale used, and on the viewing conditions and level of illumination (see, for example, R. S. Hunter, *The Measurement of Appearance*, Wiley and Sons, New York, 1975, for a recent review of numerical color scales).

In order to establish a basis for comparison of structures a first series of calculations was carried out to simulate a single semiconductor layer on glass. The refractive index of the semiconductor layer was taken at 2.0, which is a value approximating tin oxide, indium oxide, or cadmium stannate films. The value 1.52 was used for the glass substrate; this is a value typical of commercial window glass. The calculated color saturation values are plotted in FIG. 1 as a function of the semiconductor film thickness. The color saturation is found to be high for reflections from films in the thickness range 0.1 to 0.5 microns. For films thicker than 0.5 microns, the color saturation decreases with increasing thickness. These results are in accord with qualitative observations of actual films. The pronounced oscillations are due to the varying sensitivity of the eye to different spectral wavelengths. Each of the peaks corresponds to a particular color, as marked on the curve (R=red, Y=yellow, G=green, B=blue).

Using these results, the minimum observable value of color saturation was established by the following experiment: Tin oxide films with continuously varying thickness, up to about 1.5 microns, were deposited on glass plates, by the oxidation of tetramethyltin vapor. The thickness profile was established by a temperature variation from about 450° C. to 500° C. across the glass surface. The thickness profile was then measured by observing the interference fringes under monochromatic light. When observed under diffuse daylight, the films showed interference colors at the correct positions shown in FIG. 1. The portions of the films with thicknesses greater than 0.85 micron showed no observable interference colors in diffuse daylight. The green peak calculated to lie at a thickness of 0.88 micron could not be seen. Therefore, the threshold of observability is above 8 of these color units. Likewise, the calculated blue peak at $0.03\mu$ could not be seen, so the threshold is above 11 color units, the calculated value for this peak. However, a faint red peak at $0.81\mu$ could be seen under good viewing conditions, e.g. using a black velvet background and no colored objects in the field of view being reflected, so the threshold is below the 13 color units calculated for this color. We conclude from these studies that the threshold for observation of reflected color is between 11 and 13 color units on this scale, and therefore we have adopted a value of 12 units to represent the threshold for observability of reflected color under daylight viewing conditions. In other words, a color saturation of more than 12 units appears as a visibly colored iridescence, while a color saturation of less than 12 units is seen as a neutral. Color saturation of below about 5 can be achieved by practice of the invention.

It is believed that there will be little objection to commercialization of products having color saturation values of 13 or below. However, it is much preferred that the value be 12 or below and, as will appear in more detail hereinafter, there appears to be no practical reason why the most advantageous products according to the invention, e.g. those characterized by wholly color-free surfaces, i.e. below about 8, cannot be made economically.

A value of 12 or less is indicative of a reflection which does not distort the color of a reflected image in an observable way. This threshold value of 12 units is taken to be a quantitative standard with which one can evaluate the success or failure of various multilayer designs, in suppressing the iridescence colors.

Figure 1:
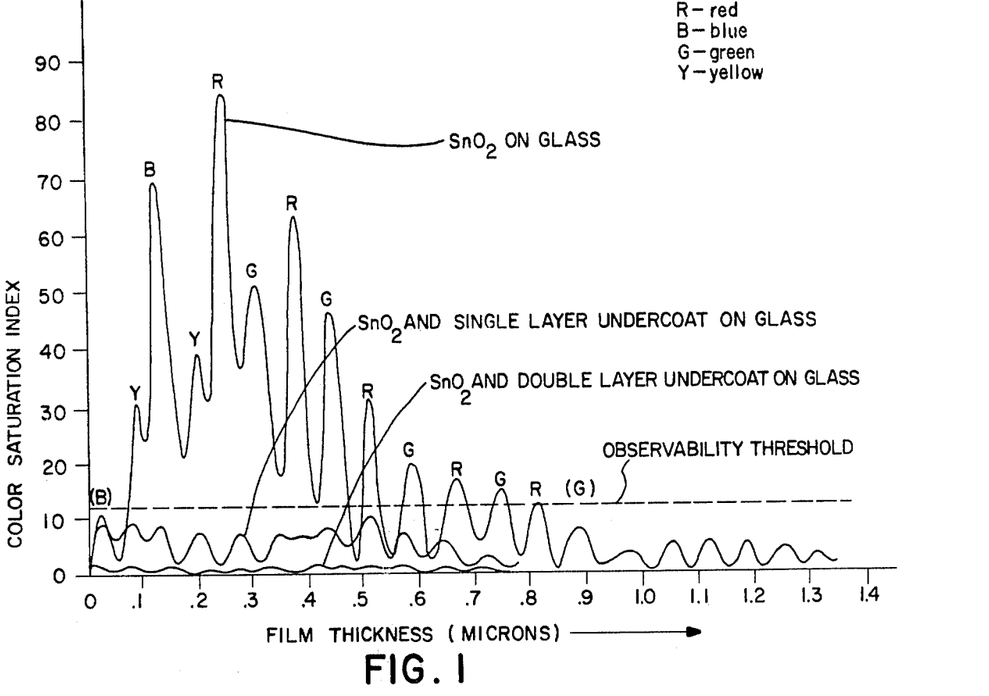
FIG. 1 is a graph illustrating the variation of calculated color intensity of various colors with semiconductor film thickness.

Coatings with a thickness of 0.85 micron or greater have color saturation values less than this threshold of 12, as may be seen in FIG. 1. Experiments reported in example 15 confirm that these thicker coatings do not show objectionable iridescence colors in daylight illumination.

USING A SINGLE LAYER BETWEEN GLASS AND SEMICONDUCTOR

One embodiment of the invention involves using a single undercoat to avoid reflected color saturation. This requires use of a carefully selected single layer of a refractive-index ($n_i$) which is intermediate between the refractive index of the glass ($n_{gl}$ or about 1.52) and the refractive index of the semiconductor ($n_{sc}$ or about 2.0). An intermediate refractive index which is the geometric mean $n_i = (n_{sc} n_{gl})^{\frac{1}{2}}$ or about 1.744, will result in the reflections from the two surfaces of the intermediate layer having the same amplitude. By choosing the thickness of the intermediate layer to be $\frac{1}{4}$ wavelength, these two reflected waves cancel each other, and do not contribute to the iridescent colors. This cancellation is exact at only a single wavelenght value, and the wavelength must be carefully selected. Therefore, an investigation was carried out to find those values which reduced the color saturation index for semiconductor films, particularly in the thickness range 0.15 to 0.4$\mu$, which semiconductors are of most interest for heat reflection and have been a particular problem with respect to iridescence. The optimum intermediate film thickness for an undercoat (i.e. a coat intermediate between glass and semiconductor) was found to be about 0.072$\mu$ (72 nanometers), which corresponds to $\frac{1}{4}$ wavelength for a (vacuum) wavelength of 500 nanometers. The color saturation remains *below* the threshold value of 12 units, for semiconductor films of all thicknesses, as may be seen from the curve in FIG. 1. Thus, the usual strong iridescence colors from a heat-reflecting film of, say, 0.3$\mu$ thickness, can be suppressed even by this single intermediate film undercoat.

The sensitivity of this single layer, anti-iridescent undercoat to variations in refractive index and thickness was studied. Changes of $\pm 0.02$ in refractive index or $\pm 10\%$ in thickness are sufficient to raise the color saturation to observable values. Accurate control of these parameters can be achieved in known glass coating operations. For example, U.S. Pat. No. 3,850,679 describes an apparatus capable of coating to $\pm 2\%$ thickness uniformity.

EVEN BETTER RESULTS WITH A DOUBLE INTERLAYER

An effective product also can be formed using two layers of intermediate refractive indices on the glass under the semiconductor film. For semiconductor films in the thickness range of 0.1 to 0.4$\mu$, it was found to be possible to provide color saturation of only about one (1) unit or less! This range is very much below the threshold for observability. For example, the two intermediate refractive ($n_1$ and $n_2$) indices for such a construction are given by $n_1 = (n_{sc})^{0.26}(n_{gl})^{0.74}$ or about 1.63

$n_2 = (n_{sc})^{0.74}(n_{gl})^{0.26}$ or about 1.86

The optimum thicknesses are about $\frac{1}{4}$ wavelength for (vacuum) wavelength 500 nanometers or about $d_1 = 76.7$ nm $d_2 = 67.2$ nm The layer of lower refractive index ($n_1$) is next to the glass, while the higher index ($n_2$) is next to the semiconductor film.

This double undercoat design is even more tolerant of deviations of its parameters from the optimum values, than is the single undercoat design. Variations of $\pm 25\%$ away from the optimum thickness still suppress the iridescence values below the observable limit, i.e. below a color saturation value of 10. Thus, very effective designs can be based on refractive indices in the ranges $n_1 = (n_{sc})^{0.26 \pm 0.03}(n_{gl})^{0.74 \pm 0.03}$ $n_2 = (n_{sc})^{0.74 \pm 0.03}(n_{gl})^{0.26 \pm 0.03}$ which corresponds to a range of $n_1$ from 1.62 to 1.65, and a range of $n_2$ from 1.88 to 1.84. The degree of manufacturing accuracy required to maintain coating thickness to a tolerance of $\pm 25\%$, is readily achieved with state-of-the art procedures. Likewise, the accuracy needed for the retractive indices is entirely practicable even when mixed materials are needed to obtain the required values.

USE OF AN INTERLAYER OF GRADUATED REFRACTIVE INDEX

It has also been discovered that a film intermediate between the glass substrate and a semiconductor layer can be build up of a graded composition, e.g. gradually changing from a silica film to a tin oxide film. Such a film is best pictured as one comprising a very large number of intermediate layers.

WHAT MATERIALS CAN BE USED

A wide range of transparent materials are among those which can be selected to make products meeting the aforesaid criteria by forming anti-iridescent undercoat layer or layers. Various metal oxides or nitrides, and their mixtures have the correct optical properties of transparency and refractive index. Table A lists some mixtures which have the correct refractive index for a single layer coating between glass and a tin oxide or indium oxide film. The weight percents necessary are taken from measured refractive index vs. composition curves, or are calculated from the usual Lorentz-Lorenz law for refractive indices of mixtures (Z. Knittl, *Optics of Thin Films*, Wiley and Sons, New York, 1976, page 473), using measured refractive indices for the pure films. This mixing law generally gives sufficiently accurate interpolations for optical work, although the calculated refractive indices are sometimes slightly lower than the measured values. Film refractive indices also vary somewhat with deposition method and conditions employed.

A routine pre-production check can be made easily, and, if necessary, one can adjust the compositions to optimum values if such performance is really required.

Aluminum oxide films, for example, show some variability in refractive index, from about 1.64 to 1.75, depending on deposition conditions. In Tables A, B and C, $Al_2O_3$-h designates the high-index (n=1.75) films, while $Al_2O_3$-l designates the low index (n=1.64) films. Films of intermediate index of refraction require intermediate compositions to produce the desired refractive indices.

Tables B and C list some mixtures which have the correct refractive index (of about 1.63 and 1.86, respectively) for use in a double interlayer between glass substrate and a primary semiconductor coating.

In addition to these optical properties, suitable undercoat layers are selected to be chemically durable and resistant to air, moisture, cleaning solutions, etc. Such a requirement eliminates, for most purposes, germanium dioxide films of the type which are subject to easy water hydrolysis. Films formed of about half $GeO_2$ and half $SnO_2$ do appear to be insoluble and resistant to attack by water.

TABLE A

Dielectric Films with Refractive Indices of Approximately 1.73–1.77

| Mixtures | Component A | Weight % | Component B | Weight % |
|---|---|---|---|---|
| 1 | $Si_3N_4$ | 67 ± 4 | $SiO_2$ | 33 ± 4 |
| 2 | $Al_2O_3$-h | 100 | — | |
| 3 | ZnO | 78 ± 3 | $SiO_2$ | 22 ± 3 |
| 4 | $Al_2O_3$-l | 55 ± 8 | ZnO | 45 ± 8 |
| 5 | MgO | 76 ± 11 | ZnO | 24 ± 11 |
| 6 | $SnO_2$ | 81 ± 3 | $SiO_2$ | 19 ± 3 |
| 7 | $SnO_2$ | 50 ± 7 | $Al_2O_3$-l | 50 ± 7 |
| 8 | MgO | 73 ± 11 | $SnO_2$ | 27 ± 11 |
| 9 | $In_2O_3$ | 81 ± 3 | $SiO_2$ | 19 ± 3 |
| 10 | $In_2O_3$ | 50 ± 7 | $Al_2O_3$-l | 50 ± 7 |
| 11 | MgO | 73 ± 12 | $In_2O_3$ | 27 ± 12 |
| 12 | $GeO_2$ | 55 ± 7 | ZnO | 45 ± 7 |
| 13 | $GeO_2$ | 52 ± 7 | $SnO_2$ | 48 ± 7 |
| 14 | $GeO_2$ | 51 ± 7 | $In_2O_3$ | 49 ± 7 |
| 15 | $Ga_2O_3$ | 91 ± 3 | $SiO_2$ | 9 ± 3 |
| 16 | $Ga_2O_3$ | 71 ± 10 | $Al_2O_3$-l | 29 ± 10 |
| 17 | MgO | 53 ± 20 | $Ga_2O_3$ | 47 ± 20 |
| 18 | $Ga_2O_3$ | 70 ± 10 | $GeO_2$ | 30 ± 10 |

TABLE B

Dielectric Films with Reflective Indices of Approximately 1.62–1.65

| Mixture | Component A | Weight % | Component B (balance) |
|---|---|---|---|
| 1 | $SiO_2$ | 53 ± 4 | $Si_3N_4$ |
| 2 | $Al_2O_3$-l | 100 | — |
| 3 | $Al_2O_3$-l | 97 ± 3 | $SiO_2$ |
| 4 | $Al_2O_3$-h | 74 ± 5 | $SiO_2$ |
| 5 | ZnO | 59 ± 4 | $SiO_2$ |
| 6 | MgO | 79 ± 5 | $SiO_2$ |
| 7 | $SnO_2$ | 62 ± 3 | $SiO_2$ |
| 8 | $In_2O_3$ | 63 ± 3 | $SiO_2$ |
| 9 | $GeO_2$ | 100 | — |
| 10 | $Ga_2O_3$ | 71 ± 3 | $SiO_2$ |

TABLE C

Dielectric Films which have Refractive Indices of Approximately 1.86 ± .02

| Mixture | Component A | Weight % | Component B (balance) |
|---|---|---|---|
| 1 | $Si_3N_4$ | 84 ± 3 | $SiO_2$ |
| 2 | ZnO | 91 ± 2 | $SiO_2$ |
| 3 | ZnO | 76 ± 5 | $Al_2O_3$-l |
| 4 | ZnO | 59 ± 9 | $Al_2O_3$-h |
| 5 | ZnO | 68 ± 7 | MgO |
| 6 | $SnO_2$ | 91 ± 2 | $SiO_2$ |
| 7 | $SnO_2$ | 78 ± 5 | $Al_2O_3$-l |
| 8 | $SnO_2$ | 60 ± 8 | $Al_2O_3$-h |
| 9 | $SnO_2$ | 70 ± 6 | MgO |
| 10 | $In_2O_3$ | 91 ± 2 | $SiO_2$ |
| 11 | $In_2O_3$ | 78 ± 5 | $Al_2O_3$-l |
| 12 | $In_2O_3$ | 61 ± 8 | $Al_2O_3$-h |
| 13 | $In_2O_3$ | 71 ± 6 | MgO |
| 14 | ZnO | 75 ± 7 | $GeO_2$ |
| 15 | $SnO_2$ | 76 ± 7 | $GeO_2$ |
| 16 | $In_2O_3$ | 76 ± 4 | $GeO_2$ |
| 17 | $Ga_2O_3$ | 80 ± 14 | ZnO |
| 18 | $Ga_2O_3$ | 79 ± 14 | $SnO_2$ |
| 19 | $Ga_2O_3$ | 78 ± 15 | $In_2O_3$ |

Note:
$Al_2O_3$-h = high density aluminum oxide film n of about 1.75
$Al_2O_3$-l = low density aluminum oxide film n of about 1.64

PROCESS FOR FORMING FILMS

All of these films can be formed by simultaneous vacuum evaporation of the appropriate materials of an appropriate mixture. For coating of large areas, such as window glass, chemical vapor deposition (CVD) at normal atmospheric pressure is more convenient and less expensive. However, the CVD method requires suitable volatile compounds for forming each material. The most convenient sources of CVD are gases at room temperature. Silicon and germanium can be deposited by CVD from gases such as silane, $SiH_2$, dimethylsilane $(CH_3)_2SiH_2$, and germane ($GeH_4$). Liquids which are sufficiently volatile at room temperature are almost as convenient as gases; tetramethyltin is such a source for CVD of tin compounds, while $(C_2H_5)_2SiH_2$ and $SiCl_4$ are volatile liquid sources for silicon. Similarly, trimethyl aluminum and dimethyl zinc, and their higher alkyl homologs, furnish volatile sources for these metals. Less convenient, but still useful, sources for CVD are solids or liquids which are volatile at some temperature above room temperature but still below the temperature at which they react to deposit films. Examples of this latter category are the acetylacetonates of aluminum, gallium, indium and zinc (also called 2, 4 pentanedionates), aluminum alkoxides such as aluminum isopropoxide and aluminum ethylate, and zinc propionate. For magnesium, no convenient compounds are known which are volatile below deposition temperature, so CVD processes are not believed to be applicable to the preparation of magnesium oxide films.

Typical conditions under which metal oxide films have been successfully formed by chemical vapor deposition are summarized in Table D. Typically, the organometallic vapor is present in about one percent (by volume) in air. The films thus formed show good adhesion to both the glass substrate, and to subsequently deposited layers of tin oxides or indium oxide. Mixed oxide layers have been formed between all these pairs of metals, using CVD techniques (except for magnesium, for which a conveniently volatile compound was not available). The refractive indices of the mixed films are measured conveniently by taking the visible reflection spectra as a function of wavelength. The positions and heights of the maxima and minima in the reflected intensity can then be related to the refractive index of the deposited film. The concentrations of the reagent species are then adjusted to form the desired refractive index.

Using these methods, a number of samples have been made on borosilicate glass (Pyrex), using ($SiO_2$—$Si_3N_4$), ($SiO_2$—$SnO_2$), ($GeO_2$—$SnO_2$), ($Al_2O_3$—$SnO_2$), ($Al_2O_3$—$Ga_2O_3$), or ($Al_2O_3$—$ZnO$) mixed layers under a $0.3\mu$ thick $SnO_2$ semiconductor layer. When the refractive index and thickness are correctly adjusted, the reflected daylight is neutral and colorless to the eye. The coatings are clear and transparent, and free of visible haze (scattered light).

TABLE D
Some Volatile Oxidizable Organometallic Compounds Suitable for Depositing Metal Oxide Layers, and Mixed Metal Oxide Layers with Oxidizing Gases Such as $O_2$ or $N_2O$

| | Compound | Volatization Temperature (°C.) | Deposition Temperature (°C.) |
|---|---|---|---|
| 1 | $SiH_4$ | gas at 20 | 300–500 |
| 2 | $(CH_3)_2SiH_2$ | gas at 20 | 400–600 |
| 3 | $(C_2H_5)_2SiH_2$ | 20 | 400–600 |
| 4 | $GeH_4$ | gas at 20 | 300–450 |
| 5 | $(CH_3)_3Al$ | 20 | 400–650 |
| 6 | $Al(OC_2H_5)_3$ | 200–300 | 400–650 |
| 7 | $Al(OC_3H_7)_3$ | 200–220 | 400–600 |
| 8 | $Al(C_5H_7O_2)_3$ | 200–220 | 500–650 |
| 9 | $Ga(C_5H_7O_2)_3$ | 200–220 | 350–650 |
| 10 | $In(C_5H_7O_2)_3$ | 200–220 | 300–600 |
| 11 | $(CH_3)_2Zn$ | 20 | 100–600 |
| 12 | $Zn(C_3H_5O_2)_2$ | 200–250 | 450–650 |
| 13 | $(CH_3)_4Sn$ | 20 | 450–650 |
| 14 | $Ta(OC_4H_9)_5$ | 150–250 | 400–600 |
| 15 | $Ti(OC_3H_7)_4$ | 100–150 | 400–600 |
| 16 | $Zr(OC_4H_9)_4$ | 200–250 | 400–600 |
| 17 | $Hf(OC_4H_9)_4$ | 200–250 | 400–600 |

THE HAZE PROBLEM

When these same depositions were tried on ordinary window glass ("soda-lime" or "soft" glass) many of the resulting coatings showed considerable haze or scattered light. When the layer first deposited on soft glass is amorphous and consists of $SiO_2$, $Si_3N_4$ or $GeO_2$ or mixtures thereof, the coating is free of haze, no matter what the subsequent layers are. $Al_2O_3$ also gives clear coatings, provided it is deposited in the amorphous form, advantageously below a temperature of about 550° C. If the initial layer contains large proportions of $Ga_2O_3$, $ZnO$, $In_2O_3$, or $SnO_2$, then haze formation is likely.

The first anti-iridescence layer to be deposited on a window glass surface is advantageously amorphous, rather than crystalline, in structure. Silicon oxy-nitride is preferred. Subsequently deposited layers can be of a polycrystalline form, without causing any haze.

Sodium and other alkali ions exert a deleterious effect on the infra-red reflectivity and electrical conductivity of tin oxide and indium oxide films.

The aforesaid amorphous films and especially silicon oxynitride films are good barriers to the diffusion of sodium ions from the glass into the semiconductor layer. By changing the oxygen/nitrogen ratio in the films, the entire range of refractive index from that of glass with a refractive index of about 1.5 to that of tin oxide or indium oxide with refractive indices of about 2, can be covered. Thus with the same basic reagents, anti-iridescence structures with any number of refractive index steps can be fabricated. Indeed, even films with continually changing proportion of reactants can be prepared. Only abundant and inexpensive materials are needed to form silicon oxynitride.

Numerous volatile reagents are available to form silicon oxynitride films. Table E lists some of the more convenient volatile materials for chemical vapor deposition of silicon oxynitride. The reaction $SiH_4 + NO + N_2H_4$ is preferred, because it appears to give higher deposition rates in the temperature range of interest for window glass, i.e. 500° C. to 600° C. However, numerous other combinations of reagents can also give successful silicon oxynitride films.

TABLE E
Source Materials for Chemical Vapor Deposition of Silicon Oxynitride Films Sources of silicon:
$SiH_4$
$(CH_3)_2SiH_2$
$(C_2H_5)_2SiH_2$
$(CH_3)_4Si$
$SiCl_4$
$SiBr_4$ Sources of oxygen:
$O_2$
$H_2O$
$N_2O$ Sources of nitrogen:
$N_2H_4$   $CH_3NHNH_2$
$NH_3$    $(CH_3)_2NNH_2$
$HN_3$ Sources of both oxygen and nitrogen:
$NO$
$NH_2OH$
$N_2H_4H_2O$

IRIDESCENCE-FREE STRUCTURES BASED ON COATINGS SPACED APART

Interference colors, i.e. the iridescence, may be reduced by use of reflections from two thin coatings of a functional inorganic coating on separate, but parallel, glass surfaces. When coating thicknesses, e.g. thicknesses of tin oxide coatings, are selected to differ by about ¼ of a wavelength (about 0.07 micron for $\lambda = 0.50$ $\mu$m and $n = 2.0$), the interference coloration practically disappears. Certainly it is reduced to the point where it ceases to become an aesthetic problem for supplier and customer. The additive coloration of, say, a red reflection in one coating and a green reflection of an adjacent interference order in a second coating, combine to produce a practically white (neutral) reflection. Similarly, the transmission of light through such a combination of complementary coatings is also neutral in color.

This color compensation is used in double glazing to reduce the strength of the interference colors from the heat-reflecting semiconductor coatings. For example, if coatings of $SnO_2$ are used on the two inner surfaces of a double glazed window, they can be chosen to differ in thickness by $0.07\mu$. For extended light sources, the reflection colors are well cancelled if the glass surfaces are reasonably parallel. For small light sources, or ones with sharp boundaries, the compensation in reflection will not be complete unless the coating surfaces are highly parallel. For observations in transmission, the requirements for parallel surfaces are not nearly as severe.

It should also be noted that films in which the interference colors have been reduced in intensity by an undercoat of intermediate or graded refractive index, can also be combined in pairs of product still further color compensation.

Moreover, for this embodiment of the invention it should be understood that the two coatings can be offset by any functionally equivalent thickness. For example, a ¾ wave thickness difference is functionally equivalent to a ¼ wave difference between the thicknesses of the two coatings.

ILLUSTRATIVE EXAMPLES OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

Figure 2:
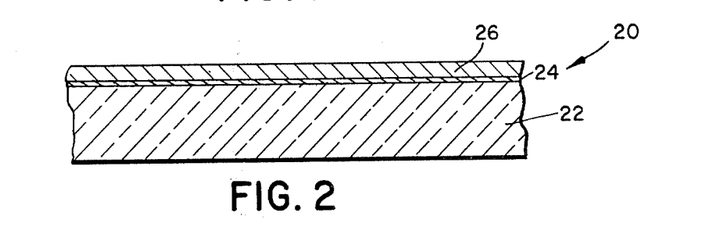
FIG. 2 illustrates, schematically and in section, a non-iridescent coated glass constructed according to the invention, with a single anti-iridescent interlayer.

Referring to FIG. 2, it is seen that transparent sheet 20 comprises a glass substrate 22, carrying an intermediate film 24 of 0.072 microns of $Si_3N_4/SiO_2$ (or of any of the other materials in Table A) having an index of refraction of 1.744. Over film 24 is a coating 26 of 0.4 microns of an infra-red reflecting semiconductor, tin oxide.

Figure 3:
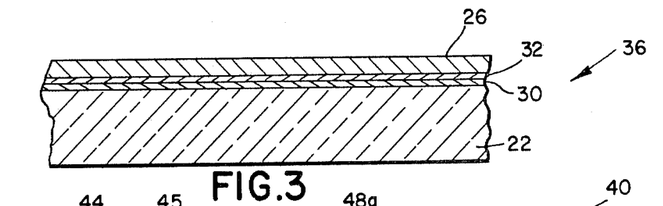
FIG. 3 illustrates, schematically, and in section, a non-iridescent coated glass, constructed according to the invention, with plural anti-iridescent interlayers.

FIG. 3 illustrates a window 36 constructed of the same semi-conductor film 26 and the same glass 22 and two intermediate coatings as follows: Coating 30 which is 0.077 microns thick and has a refractive index of about 1.63. Coating 32 is about 0.067 microns and has a refractive index of about 1.86. Coating 30 is formed of any of the materials disclosed in Table B. Coating 32 is formed of any of the materials disclosed in Table C.

Figure 4:
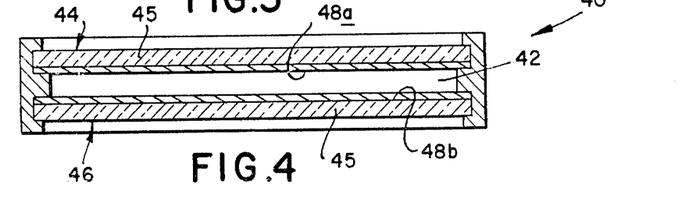
FIG. 4 illustrates, schematically and in section, a double glazed window structure which exhibits a substantially improved appearance as a result of coatings carried thereof which reduce or eliminate objectionable iridescence.

FIG. 4 illustrates a double-glazed window structure 40 enclosing an insulating air space 42 between an inner transparent sheet 44 and an outer transparent sheet 46. Each of sheets 44 and 46 are formed of glass 45 and a semiconductor coating 48a or 48b on the inner surface of the glass.

The semiconductor coating 48a is of about 0.2 microns thick, but coating 48b is about 0.27 microns thick; thus, there is a difference of about ¼ wavelength in the two coatings.

EXAMPLE 1

A glass with a single anti-iridescent undercoat layer, was produced by heating a clear window glass disc, 6 inches diameter, to about 580° C. A gas mixture containing about 0.4% silane ($SiH_4$), 0.1% nitric oxide (NO), 2% hydrazine ($N_2H_4$), and balance nitrogen ($N_2$) was passed over the glass surface for about one minute, at a rate of 1 liter/minute. This coated the glass surface with a uniform, transparent film of silicon oxynitride. The surface was then further coated with a fluorine-doped tin oxide layer, by flowing a gas mixture of 1% teramethyltin $(CH_3)_4Sn$, 3% bromotrifluoromethane $CF_3Br$, 20% oxygen $O_2$, balance nitrogen $N_2$, past the silicon oxynitride surface at 560° C. for about one minute. Then the coated glass was allowed to cool slowly in air to room temperature, over a period of about one hour.

The glass coated by this procedure did not show visible interference colors in reflected or transmitted daylight. The surface reflected about 90% of infrared radiation at a 10 micron wavelength, and transmitted about 90% of visible light. The electrical sheet resistance was measured to be about 3 ohms/square.

In order to measure the properties of the silicon oxynitride layer, the tin oxide film was removed from an area of the coated surface by rubbing with a mixture of zinc dust and diluted hydrochloric acid. This etchant does not affect the silicon oxynitride undercoat. The refractive index of the silicon oxynitride film was measured to be 1.74 by the $CH_2I_2$ liquid test described below. The visible reflectivity of the silicon oxynitride film was measured, finding a maximum of 5000 Å and a thickness of 0.072 micron, corresponding to the desired ¼ wavelength thickness for 5000 Å light.

The refractive indices of these silicon oxynitride films depend on the nitrogen to oxygen ratio in the films. This composition is easily adjusted by varying the $N_2H_4/NO$ ratio in the gas. Increasing the N/O ratio increases the refractive index. The exact refractive index also depends on the purity of the starting materials, and particularly on the amount of water present as an impurity in the hydrazine. Commercial hydrazine always contains at least a few percent water. By drying the hydrazine through distillation from a drying agent, such as sodium hydroxide, potassium hydroxide, or barium oxide, one can increase the refractive index of the film. Conversely, one can decrease the refractive index by adding water to the hydrazine. The film refractive index also depends on the exact conditions of film growth, including deposition temperature, gas flow rate, etc. Therefore the conditions disclosed above cannot be expected to give a film of precisely n=1.74, when other reagents or deposition conditions are used. However, small adjustments of the composition should be sufficient to produce films of the desired refractive index values.

The semiconductor films may also have refractive indices different from the value 2.0 observed for the tin oxide films described herein. The corresponding optimum value(s) for a single (or double) undercoat layer(s) may then be adjusted, by the relationships given above. The corresponding gas-phase compositions which produce the desired refractive index films for anti-iridescent undercoat(s) may then be found by routine experimentaion, to fit the precise conditions of any manufacturer or investigator having ordinary skill in the CVD art.

The thickness of a film of measured refractive index is easily determined by measuring its reflection spectrum in visible and infra-red light. This spectrum is readily calculated, as a function of film thickness, using the standard optical formulas of Fresnel and Airy. In most of the practical designs disclosed above, one desires to form a film of ¼ wavelength thickness, for a wavelength (in air) of about 5000 Å. In this case the reflection spectrum of a single such film on glass, shows a broad maximum centered at a wavelength of 5000 Å.

EXAMPLE 2

Aluminum 2,4 pentanedionate, Al $(C_5H_7O_2)_3$, (also known as aluminum acetylacetate) is a white solid which melts at 189° C. to a clear liquid, which boils at 315° C. This material was placed in a bubbler heated to about 250° C., through which nitrogen carrier gas was passed. When this gas mixture was mixed with dry oxygen at 250° C., no reaction was noted. However, when moisture was added to the oxygen, intense white fumes formed in the gas mixture. Such fumes are indicative of hydrolysis. In order to prevent this premature hydrolysis reaction, the gas streams must be kept as dry as possible.

The mixture of aluminum 2,4 pentanedionate vapor, nitrogen carrier gas and 20% oxygen was passed over heated glass surfaces. At 500° C., a faint deposit was formed, less than $0.1\mu$ thick, which was evident only by its increased reflectivity. At 525° C. a film $0.3\mu$ thick was grown in about 3 minutes. This film showed faint interference colors under white light, and distinct interference bands under monochromatic illumination. At 550° C. the aluminum oxide films grew even faster, and a small amount of powder formed by homogeneous nucleation, and deposited on the apparatus surface.

Next, fluorine-doped tin oxide films were grown on top of the aluminum oxide films at temperatures in the range of 500° C. to 540° C. Thickness in the range of 0.3 to $0.5\mu$ were examined carefully, for these thicknesses show the strongest interference colors. The intensity of the colors were substantially reduced, when compared to tin oxide films of the same thickness, without the aluminum oxide undercoat.

Films in which the aluminum oxide film has ¼ wavelength thickness (500 nm wavelength, which is near the peak of the spectral sensitivity of the eye for daylight illumination) exhibit the greatest suppression of iridescent color. For this thickness (approximately $0.072\mu$ for ¼ wavelength), the reflections from the glass-$Al_2O_3$ and $Al_2O_3$-$SnO_2$ interfaces cancel each other most effectively. However, there is also some substantial reduction in color intensity, even when the thickness of the $Al_2O_3$ is not optimum.

As glass substrates, both Pyrex borosilicate glass, and soda lime (window) glass were used. Good results were obtained on both substrates.

The aluminum oxide layer also was effective in preventing surface devitrification of the soda lime glass surface when tin oxide was deposited at 500° C. to 540° C. Thus, the aluminum oxide is believed to act in protecting the soda lime glass surface from crystallizing around the nuclei provided by the tin oxide crystals and, consequently, serving to avoid any hazing of the glass during the coating process.

EXAMPLE 3

A double glazed window is constructed of clear, soda-lime type glass. The glass is treated with silica-type coating to eliminate haze according to the conventional procedure disclosed in U.S. Pat. No. 2,617,745.

The structure of the double glazed window is similar to that shown in FIG. 4. Interior surface A carries 0.26 micron coating of tin oxide. Interior surface B carries a coating of 0.33±0.02 micron coating of a tin oxide composition. Each of these coatings, when viewed alone, exhibits a readily visible, highly colored, iridescent color which was dominantly red or green to most observers. When assembled, substantially parallel to one another, as in the structure of FIG. 4, the iridescent color is greatly muted whether viewed from the side of the double glazed structure facing the sun or from the other side of the same structure.

EXAMPLE 4

Experiments were carried out to prepare graded refractive index layers between glass (n of about 1.5) and tin oxide (n of about 2.0) coatings. A graded layer of $Si_xSn_{1-x}O_2$ was utilized with 'x" gradually decreasing from 1 to zero as the layer was built upon the glass surface. The $SnO_2$ layer was of about 0.3 microns thick; the underlying, graded area was about 0.3 microns thick. The resulting structures exhibit markedly reduced interference coloration, compared to layers of $SnO_2$ of the same thickness but without the graded interlayer region between glass and the $SnO_2$.

The volatile sources of silicon are, in one instance, $SiH_4$ (from a 1% mixture in $N_2$ carrier gas) and, in another instance, $(CH_3)_2SiH_2$ (from a cylinder of the pure gas). Deposition was carried out at a surface temperature of 480° C. Gas concentrations were initially about 0.4% silane (or alkyl-substituted silane), 10% oxygen, balance nitrogen. Then tetramethyltin $(CH_3)_4Sn$ was gradually introduced up to a concentration of 1% over a period of about 3 minutes, while the silane concentration was gradually decreased to zero over the same period. Then the carrier gas for the tetramethyltin was cut off and the apparatus purged for about 5 minutes with air to remove the last traces of the silane. Then a gas flow of 1% $(CH_3)_4Sn$, 3% $CF_3Br$, 20% $O_2$, balance nitrogen, was passed under the surface for three minutes to deposit a layer of fluorine-doped tin oxide about $0.4\mu$ thick.

The interference colors were considerably less vivid on these coatings with a graded refractive index undercoat.

EXAMPLE 5

A similar process is carried out using $GeH_4$ in place of $SiH_4$. The graded layer is formed of $Ge_xSn_{1-x}O_2$ with "x" gradually decreasing from one to zero as the layer is build up on the glass. Since the refractive index of pure $GeO_2$ is about 1.65, the graded layer still has a refractive index discontinuity from that of glass (about 1.5). However, the uniformity of the deposition was somewhat better than obtained with the $SiH_4$. Reductions in visibility of iridescence were noted similar to those noted with respect to Example 4.

EXAMPLES 4-9

Example 1 is repeated utilizing, as the intermediate layer between glass and tin oxide, the following materials selected from Table A:
Example 6: 82% $In_2O_3$/18% $SiO_2$
Example 7: 58% $GeO_2$/42% ZnO
Example 8: 70% $Ga_2O_3$/30% $Al_2O_3$-1
Example 9: 60% $Al_2O_3$-1/40% ZnO
Low iridescence is realized in each of these cases.

EXAMPLES 10-14

The following materials, all selected from Table B and C, are used as the two intermediate layers replacing the single intermediate layers of Example 1 and 6-9:

|  | N of about 1.63 | N of about 1.86 |
|---|---|---|
| Example 10 | 97% $Al_2O_3$-l/3% $SiO_2$ | 84% $Si_3N_4$/16% $SiO_2$ |
| Example 11 | 60% ZnO/40% $SiO_2$ | 90% ZnO/10% $SiO_2$ |
| Example 12 | 63% $In_2O_3$/37% $SiO_2$ | 60% $SnO_2$/40% $Al_2O_3$-h |
| Example 13 | 70% $Ga_2O_3$/29% $SiO_2$ | 76% $SnO_2$/24% $GeO_2$ |
| Example 14 | 62% $SnO_2$/38% $SiO_2$ | 61% $In_2O_3$/39% $Al_2O_3$-h |

EXAMPLE 15

A tin oxide coating is placed on a glass substrate at different thicknesses. (The glass substrate is first coated with an ultra-thin film of silicon oxynitride to provide an amorphous, haze-inhibiting surface.)

| Thickness of Tin Oxide | Iridescence Visibility |
|---|---|
| 0.3 | strong |
| 0.6 | distinct, but weaker |
| 0.9 | barely detectable except in fluorescent light |
| 1.3 | weak, even in fluorescent light |

The latter two materials are not aesthetically objectionable for architectural use.

A Method of Confirming Coating Quality

A simple method for quickly checking the refractive index of thin films was developed, in order to be able to find deposition conditions for films of the desired refractive index. Suppose, for example, a film with refractive index n=1.74 is desired for an undercoat layer. A liquid with this refractive index is selected. For this example, diiodomethane, n=1.74, is used. A film whose thickness is about 0.2 to 2 microns, is deposited on a glass surface. The coated glass is observed by reflected light from a monochromatic light source, such as a filtered mercury lamp at λ=5461 Å. The coated glass shows an interference pattern of dark and bright bands, if the thickness of the film varies over the glass surface. A drop of the liquid with known refractive index is placed on the film. If the refractive index of the film exactly matches that of the liquid, then the interference pattern disappears under the drop.

If the refractive indices of film and drop do not match exactly, then the interference pattern is still visible under the drop, but is weaker in intensity there. If this weak interference pattern under the drop is a direct continuation of the band pattern on the rest of the film, then the refractive index of the film is *larger* than that of the reference liquid. If, on the other hand, the band pattern under the drop is reversed (light and dark areas reversed) from what is present without the liquid drop, then the refractive index of the film is *smaller* than that of the reference liquid.

By using this simple, but accurate, measurement of film refractive index, the conditions for forming a film can be adjusted easily in a series of test runs, to match the desired value. By choosing other reference liquids, one can adjust films to various other values. n=1.63, used in a two-layer undercoat, can be set using 1,1,2,2 tetrabromoethane as a reference liquid. n=1.86, for the other layer in a two layer undercoat design, can be adjusted to a solution of sulfur and phosphorous in diiodomethane, described by West in *American Mineral,* Vol. 21, pg. 245 (1936). From the above it will also be apparent to those skilled in the art that the general procedure can be used as a quality control tool in manufacture. Liquids of known refractive index are also furnished by Cargille Laboratories, New Jersey.

It is to be realized the advantageous processes of the invention include the conservation of heat in buildings with substantial areas of glass and also include the electrical heating of windows, as in automobiles and airplanes, using the resistive features of the coatings of the invention. In general, these coatings are ohmic, usually semiconductive.

It is also to be understood that the following claims are intended to cover all of the generic and specific features of the invention herein described and all statements of the scope of the invention which might be said to fall therebetween.

What is claimed is:

1. In a process for avoiding the loss of heat from a building through transparent glassed areas of the building, while achieving an iridescence-free appearance for said areas, said process comprising the step of reflecting infra-red radiation back into said building from a thin coating of an infra-red-reflective semiconductor film which normally exhibits iridescence on the surface of said glass, the improvement comprising the step of utilizing a transparent intermediate layer of a metal nitride, metal oxide, or mixture thereof, between said glass and said thin coating to provide at least two interfaces associated with said intermediate layer; said interfaces, together with the mass of said intermediate layer being utilized to achieve said iridescence-free apearance in daylight illumination, and wherein said intermediate layer is selected to have a refractive index defined as about the square root of the multiple of the refractive indices of said glass and said infra-red-reflective film, and depositing said intermediate layer an optical thickness of about ¼ wavelength of light having a vacuum wavelength of about 500 nanometers.

2. In a process for avoiding the loss of heat from a building through transparent glassed areas of the building, while achieving an iridescence-free appearance for said areas, said process comprising the step of reflecting infra-red radiation back into said building from a thin coating of an infra-red-reflective semiconductor film which normally exhibits irridescence on the surface of said glass, the improvement comprising the step of utilizing a transparent precoating of a metal nitride, metal oxide, or mixture thereof, between said glass and said thin coating to provide at least two interfaces associated with said precoating layer, and wherein said precoating is selected to have a composite refractive index defined as about the square root of the multiple of the refractive indices of said glass and said thin coating of infra-red reflective semiconductor film, and depositing said precoating in two layers each having an optical thickness of about ¼ wavelength of light having a vacuum wavelength of about 500 nanometers, and substantially diminishing iridescent colors of said structure by providing at least two additional interfaces which form means, together with the mass of said precoating, to reflect and refract light such that the observability, in daylight illumination, of said iridescent colors in substantially reduced.

3. In a process for making a substantially non-iridescent structure formed of at least one transparent glass sheet and comprising thereon an inorganic coating of an infra-red reflective material which material is of the type that is a transparent semiconductor and of a thickness that normally exhibits iridescent colors in daylight illumination, the improvement comprising the steps of precoating said glass, subsequently coating with said inorganic material, and wherein said precoating is selected to have a refractive index defined as about the square root of the multiple of the refractive indices of said glass and the inorganic infra-red reflective coating, and depositing said precoating to an optical thickness of about ¼ wavelength of light having a vacuum wavelength of about 500 nanometers, and substantially diminishing said iridescent colors by providing at least two interfaces which form means, together with the mass of said precoat, to reflect and refract light such that the observability, in daylight illumination, of said iridescent colors is substantially reduced.

4. A process as defined in claim 3 wherein said infra-red reflective semiconductor layer is formed to be less than 0.4 microns in thickness.

5. A process as defined in claim 4 which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

6. A process as defined in claim 3 wherein said inorganic and pre-coating steps are carried out to form a total coating of from 0.1 to 1 micron in thickness.

7. A process as defined in claim 6, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

8. A process as defined in claim 3 wherein said inorganic and precoating steps are carried out to such thicknesses and with such materials that a color saturation value below 5 is achieved for said structure.

9. A process as defined in claim 8 wherein said steps together are carried out to form a total coating of from 0.1 to 1 micron in thickness.

10. A process as defined in claim 8 wherein said glass sheet is formed of clear glass or glass of light tint, and is free from metallic, gray or bronze and other dark-toned tones capable of suppressing the visibility of iridescence and reducing the transmittance of the structures to less than about 25%.

11. A process as defined in claim 3 wherein said precoating is carried out to such thickness and with such materials that a color saturation value below 8 is achieved for said structure.

12. A process as defined in claim 11, which comprises coating glass sheets which are formed of clear glass or glass of light tint, said structure being free from metallic, gray or bronze and other dark toned-tones capable of suppressing the visibility of iridescence and reducing the transmittance of the structures to less than about 25%.

13. A process as defined in claim 11 wherein said inorganic and precoating steps are carried out to form a total coating of from 0.1 to 1 micron in thickness.

14. A process as defined in claim 11 wherein said infra-red reflective semiconductor coating is formed to be less than 0.4 microns in thickness.

15. A process as defined in claim 3 wherein said coatings are carried out to such thickness and with such materials that a color saturation value below 13 is achieved.

16. A process as defined in claim 15 wherein said coating steps together form a total coating on said glass sheet of from 0.1 to 1 micron in thickness.

17. A process as defined in claim 15 wherein said infra-red reflective semiconductor layer is formed to be less than 0.4 microns in thickness.

18. A process as defined in claim 15, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

19. A process as defined in claim 3 wherein said subsequent coating is a predominantly stannic oxide material.

20. A process as defined in claim 19 wherein said coating steps together form a total coating on said glass sheet of from 0.1 to 1 micron in thickness.

21. A process as defined in claim 19 wherein said coating steps together form a total coating on said glass sheet of from 0.1 to 1 micron in thickness.

22. A process as defined in claim 19, which comprises coating glass sheets which are formed only of clear glass or glass of light tint, said structure being free from metallic, gray, or bronze and other dark-toned tones capable of suppressing the visibility of iridescence and reducing the transmittance of the structures to less than about 25%.

23. A process as defined in claim 3 wherein said precoating step comprises depositing an amorphous material as a means to avoid haze-formation on said glass during subsequent application of said infra-red reflective coating.

24. A process as defined in claim 23 wherein said coating steps are carried out to such thickness and with such materials that a color saturation value below 8 is achieved for said structure.

25. A process as defined in claim 23 wherein said coating steps are carried out to such thickness and with such materials that a color saturation value below 13 is achieved for said structure.

26. A process as defined in claim 23 wherein said coating steps together form a total coating on said glass sheet of from 0.1 to 1 micron in thickness.

27. A process as defined in claim 23, which comprises coating glass sheets which are formed only of clear glass or glass of light tint, said structure being free from metallic, gray or bronze and other dark toned-tones capable of suppressing the visibility of iridescence and reducing the transmittance of the structures to less than about 25%.

28. A process as defined in claim 23 wherein said coating steps are carried out to form a total coating of from 0.1 to 1 micron in thickness.

29. A structure as defined in claim 3 wherein said precoating step lays down a material having a refractive index of from about 1.7 to 1.8 and about 64 to 80 nanometers thick, and wherein said subsequent coating step lays down a coating having a refractive index of about 2, and said glass has a refractive index of about 1.5.

30. A process as defined in claim 29 wherein said coatings are carried out to such thickness and with such materials that a color saturation value below 5 is achieved for said structure.

31. A process as defined in claim 29 wherein said coating steps together form a total coating on said glass sheet of from 0.1 to 1 micron in thickness.

32. A process as defined in claim 31 which comprises coating transparent sheeting which is formed only of clear glass or glass of light tint, said structure being free from metallic, gray or bronze and other dark-toned tones capable of suppressing the visibility of iridescence.

33. A process as defined in claim 29 wherein said coating steps are carried out to form a total coating of from 0.1 to 1 micron in thickness.

34. A process as defined in claim 29 wherein said precoating is principally formed of aluminum oxide.

35. A process as defined in claim 34 wherein said coating steps together form a total coating of from 0.1 to 1 micron in thickness on the glass sheet.

36. A process as defined in claim 34 which comprises coating transparent sheeting which is formed only of clear glass or glass of light tint, said structure being free from metallic, gray or bronze and other dark-toned tones capable of suppressing the visibility of iridescence.

37. The process of claim 29 in which said precoating is formed from metal oxide, metal nitride, or a mixture thereof.

38. A process as defined in claim 37 wherein said coating steps are carried out to form a total coating of from 0.1 to 1 micron in thickness.

39. A process as defined in claim 37 which comprises coating transparent sheeting which is formed only of clear glass or glass of light tint, said structure being free from metallic, gray or bronze and other dark-toned tones capable of suppressing the visibility of iridescence.

40. A process as defined in claim 37 in which the precoating step is carried out using metal oxide and nitride compositions selected from those disclosed in Table A of the Specification.

41. A process as defined in claim 40 wherein said coating steps are carried out to such thickness and with such materials that a color saturation value below 13 is achieved for said structure.

42. A process as defined in claim 40 wherein said coating steps are carried out to such thickness and with such materials that a color saturation value below 8 is achieved for said structure.

43. A process as defined in claim 29 wherein said precoating step comprises coating an amorphous material on said glass which avoids haze-formation on said glass during application of said subsequent coating.

44. A process as defined in claim 43 wherein said precoating and subsequent coating steps together form a total coating of from 0.1 to 1 micron in thickness.

45. A process of claim 43 wherein said amorphous film is silicon oxynitride.

46. A process as defined in claim 45 wherein said coating steps are carried out to such thickness and with such materials that a color saturation value below 13 is achieved for said structure.

47. A process as defined in claim 45 wherein said coating steps are carried out to such thickness and with such materials that a color saturation value below 8 is achieved for said structure.

48. A process as defined in claim 43 which process comprises coating transparent sheeting which is formed only of clear glass or glass of light tint, said structure being free from metallic, gray or bronze and other dark-toned tones capable of suppressing the visibility of iridescence.

49. A process as defined in claim 43 wherein said coating steps together form a total coating thickness of from 0.1 to 1 micron in thickness.

50. A process as defined in claim 29 wherein said subsequent coating is predominantly formed of stannic oxide.

51. A process as defined in claim 50 wherein said coating steps together form a total coating of from 0.1 to 1 micron in thickness.

52. A process as defined in claim 50 wherein said coating steps are carried out to such thickness and with such materials that a color saturation value below 5 is achieved for said structure.

53. A process as defined in claim 50 wherein said precoating and subsequent coating steps together form a total coating of from 0.1 to 1 micron in thickness.

54. A process as defined in claim 50 which structure comprises coating transparent sheeting which is formed only of clear glass or glass of light tint, said structure being free from metallic, gray or bronze and other dark-toned tones capable of suppressing the visibility of iridescence.

55. A process as defined in claim 50 wherein said coating steps are carried out to such thickness and with such materials that a color saturation value below 8 is achieved.

56. A process as defined in claim 29 wherein said coating steps are carried out to such thickness and with such materials that a color saturation value below 13 is achieved.

57. A process as defined in claim 3, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

58. In a process for making a substantially non-iridescent structure formed of at least one transparent glass sheet and comprising thereon an inorganic coating of an infra-red reflective material which material is of the type that is a transparent semiconductor and normally exhibits iridescent colors in daylight illumination, the improvement comprising the steps of forming a precoating on said glass and subsequently coating with said inorganic material coating, wherein said precoating is selected to have a composite refractive index defined as about the square root of the multiple of the refractive indices of said glass and the inorganic infra-red reflective coating, and depositing said precoating in two layers each having an optical thickness of about $\frac{1}{2}$ wavelength of light having a vacuum wavelength of about 500 nanometers, and substantially diminishing iridescent colors of said structure by providing two additional interfaces which form means, together with the mass of said precoating, to reflect and refract light such that the observability, in daylight illumination, of said iridescent colors is substantially reduced.

59. A process as defined in claim 58 which comprises coating only transparent sheeting which is formed of clear glass or glass of light tint, said sheeting being free from metallic, gray or bronze and other dark-toned tones capable of themselves substantially suppressing the visibility of iridescence.

60. A process of claim 58 wherein said precoating closer to said glass is silicon oxynitride.

61. A process as defined in claim 58 wherein said inorganic infra-red reflective coating is of doped stannic oxide.

62. A process as defined in claim 58 wherein said precoating and subsequent coating steps together form a total coating of from 0.1 to 1 micron in thickness.

63. A process as defined in claim 58 wherein said precoating is deposited as two layers including:
(a) one film closer to the glass and having a composition disclosed in Table B; and
(b) a second film closer to said subsequent coating and having a composition disclosed in Table C of the Specification.

64. A process as defined in claim 58 comprising the step of depositing an amorphous layer immediately over said glass.

65. A process as defined in claim 58 wherein said precoating comprises depositing two layers including
(a) a first film closer to the glass and having a refractive index about that given by the formula $$n_a = n_{sc}^{0.26} n_{gl}^{0.74}$$

and
(b) a second film closer to said inorganic infra-red reflective coating and having a refractive index about that given by the formula $$n_b = n_{sc}^{0.74} n_{gl}^{0.26}$$

wherein $n_{sc}$ is the refractive index of said inorganic infra-red reflective coating and $n_{gl}$ is the refractive index of the glass.

66. A process as defined in claim 65 which comprises coating transparent sheeting which is formed only of clear glass or glass of light tint, said structure being free from metallic, gray or bronze and other dark-toned tones capable of suppressing the visibility of iridescence.

67. A process as defined in claim 65 comprising depositing an amorphous layer immediately over said glass.

68. A process as defined in claim 67 wherein said coating steps are carried out to such thickness and with such materials that a color saturation value below 8 is achieved for said structure.

69. A process of claim 67 wherein said amorphous film is silicon oxynitride.

70. A process as defined in claim 65 wherein said precoating step comprises coating two layers including:
(a) coating first of said two layers closer to the glass and having a composition disclosed in Table B; and
(b) coating the second of said two layers over first layer and having a composition disclosed in Table C of the Specification.

71. A process as defined in claim 65 wherein said inorganic infra-red reflective coating is formed of a material which is predominantly stannic oxide.

72. A process as defined in claim 65 wherein said precoating comprises depositing two layers including:
(a) coating first of said two layers closer to the glass, said first layer having a refractive index in a range of about 1.6 to 1.7; and
(b) coating a second layer over said first layer, said second layer having a refractive index in a range of about 1.8 to 1.9.
and wherein said inorganic infra-red reflective coating has a refractive index of about 2, and said glass has a refractive index of about 1.5.

73. A process as defined in claim 72 wherein said inorganic infra-red reflective coating is formed of a material which is predominantly stannic oxide.

74. A process as defined in claim 72 which comprises coating transparent sheeting which is formed only of clear glass or glass of light tint, said structure being free from metallic, gray or bronze and other dark-toned tones capable of suppressing the visibility of iridescence.

75. A process as defined in claim 65 wherein said precoating is deposited as two layers including:
(a) one layer closer to the glass and having a composition disclosed in Table B; and
(b) a second layer over said first layer and having a composition disclosed in Table C of the Specification.

76. A process as defined in claim 72 comprising coating an amorphous layer immediately over said glass.

77. The process of claim 76 wherein said film coated closest to said glass is silicon oxynitride.

78. In a process for making a substantially non-iridescent structure formed of at least one transparent glass sheet and comprising thereon an inorganic coating of an infra-red reflective material which material is of the type that is a transparent semiconductor and of a thickness that normally exhibits iridescent colors in daylight illumination, the improvement comprising the steps of placing a precoating on said glass under a subsequent coating of said inorganic material wherein said precoating is deposited in the form of a composition which is graded with respect to refractive index by gradually increasing said refractive index as said precoating builds up between said glass and said infra-red reflecting material, from a refractive index closer to that of said glass to a refractive index closer to that of said infra-red reflective material, and diminishing iridescent colors of said structure, together with the mass of said precoat, by reflecting and refracting light such that the observability, in daylight illumination, of said iridescent colors is substantially reduced.

79. A process as defined in claim 78 which comprises coating transparent sheeting which is formed only of clear glass or glass of light tint, said structure being free from metallic, gray, or bronze and other dark-toned tones capable of suppressing the visibility of iridescence.

80. A process as defined in claim 78, wherein said precoating comprises a silicon oxynitride mixture of $XSiO_2(1-X)Si_3N_4$ where X changes from near unity at the glass surface to near zero at the boundary of said subsequent coating.

81. A process as defined in claim 78 wherein said precoating and subsequent coating steps together form a total coating of from 0.1 to 1 micron in thickness.

82. A process as defined in claim 78 wherein said coatings are carried out to such thickness and with such materials that a color saturation value below 13 is achieved.

83. A process as defined in claim 81 which comprises coating transparent sheeting which is formed only of clear glass, or glass of light tint, said structure being free from metallic, gray or bronze and other dark-toned tones capable of suppressing the visibility of iridescence.

84. A process as defined in claim 82 wherein said coatings are carried out to such thickness and with such materials that a color saturation value below 8 is achieved.

85. A process as defined in claim 80 which comprises coating transparent sheeting which is formed only of clear glass, or glass of light tint, said structure being free from metallic, gray or bronze and other dark-toned tones capable of suppressing the visibility of iridescence.

86. A process as defined in claim 83 wherein said coatings are carried out to such thickness and with such materials that a color saturation value below 8 is achieved.

87. A process as defined in claim 78 wherein said Color Index value is below about 13, wherein said coatings are from about 0.1 to 1 micron thick, and wherein said subsequent coating is formed of a composition which is primarily tin oxide.

88. A process as defined in claim 83 wherein said coating are carried out to such thickness and with such materials that a color saturation value below 13 is achieved.

89. A process as defined in claim 78 wherein said gradient of said precoating is formed stepwise by a plurality of coating increments of different refractive indices.

90. A process as defined in claim 89, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

91. A process as defined in claim 89 which comprises coating transparent sheeting which is formed only of clear glass or glass of light tint, said structure being free from metallic, gray or bronze and other dark-toned tones capable of suppressing the visibility of iridescence.

92. A process as defined in claim 89 wherein said coatings are carried out to such thickness and with such materials that a color saturation value below 13 is achieved for said structure.

93. A process as defined in claim 78, wherein said precoating step comprises coating a mixture of $Si_xSn_{1-x}O_2$ or $Ge_xSn_{1-x}O_2$, where x ranges from near unity at the glass surface, to zero at the boundary of said subsequent coating.

94. A process as defined in claim 93 wherein said coatings are carried out to such thickness and with such materials that a color saturation value below 8 is achieved.

95. A process as defined in claim 93 which comprises coating transparent sheeting which is formed only of clear glass or glass of light tint, said structure being free from metallic, gray or bronze and other dark-toned tones capable of suppressing the visibility of iridescence.

96. A process as defined in claim 93, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

97. A process as defined in claim 93 wherein said coatings are carried out to such thickness and with such materials that a color saturation value below 13 is achieved.

98. A process as defined in claim 93 wherein said coating steps together form a total coating of from 0.1 to 1 micron in thickness.

99. A process as defined in claim 78 wherein said coating steps together form a total coating of from 0.1 to 1 micron in thickness.

100. A process as defined in claim 99 which comprises coating transparent sheeting which is formed only of clear glass or glass of light tint, said structure being free from metallic, gray or bronze and other dark-toned tones capable of suppressing the visibility of iridescence.

101. A process as defined in claim 99, which comprises coating glass sheets which are formed only of clear glass or glass of light tint, said structure being free from metallic, gray or bronze and other dark-toned tones capable of suppressing the visibility of iridescence and reducing the transmittance of the structures to less than about 25%.

102. A process as defined in claim 99 wherein said coatings are carried out to such thickness and with such materials that a color saturation value below 13 is achieved.

103. A process as defined in claim 101 wherein said coatings are carried out to such thickness and with such materials that a color saturation value below 8 is achieved.

* * * * *

UNITED STATES PATENT AND TRADEMARK OFFICE
CERTIFICATE OF CORRECTION

PATENT NO. : 4,308,316

DATED : December 29, 1981

INVENTOR(S) : Roy G. Gordon

It is certified that error appears in the above–identified patent and that said Letters Patent are hereby corrected as shown below:

Column 2 line 62: after "method" insert -- and --.

Column 3 line 53: after "vary" insert -- with --.

Column 5 line 42: change "wavelenght" to -- wavelength --.

Column 6 line 39: change "retractive" to -- refractive --.

Column 6 line 47: change "build" to -- built --.

Column 6 line 56: change "or", 2nd occurance, to -- and --.

Column 8 line 32: change "of" to -- for --.

Column 8 line 34: change $SiH_2$" to -- $SiH_4$ --.

Column 11 line 1: change "of product" to -- to produce --.

Column 13 line 9: change "acetylacetate" to -- acetylacetonate --.

UNITED STATES PATENT AND TRADEMARK OFFICE
CERTIFICATE OF CORRECTION

PATENT NO. : 4,308,316

DATED : December 29, 1981

INVENTOR(S) : Roy G. Gordon

It is certified that error appears in the above—identified patent and that said Letters Patent are hereby corrected as shown below:

Column 14 line 59: change "4-9" to -- 6-9 --.

Column 16 line 40: after "layer" insert -- to --.

Column 16 line 67: change "in" to -- is --.

Column 20 line 57: change "1/2" to -- 1/4 --.

Column 22 line 3: change "1.9." to -- 1.9 --.

Column 23 line 24: change "coating" to -- coatings --.

Signed and Sealed this

First Day of June 1982

[SEAL]

Attest:

GERALD J. MOSSINGHOFF

Attesting Officer

Commissioner of Patents and Trademarks